US011463632B2

(12) United States Patent
Andersson et al.

(10) Patent No.: US 11,463,632 B2
(45) Date of Patent: Oct. 4, 2022

(54) DISPLAYING A VIDEO STREAM

(71) Applicant: Axis AB, Lund (SE)

(72) Inventors: Markus Andersson, Lund (SE); Stefan Tran, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/952,095

(22) Filed: Nov. 19, 2020

(65) Prior Publication Data
US 2021/0176410 A1    Jun. 10, 2021

(30) Foreign Application Priority Data

Dec. 9, 2019  (EP) .................................... 19214488

(51) Int. Cl.
H04N 5/272     (2006.01)
H04N 5/232     (2006.01)
H04N 7/18      (2006.01)
G06V 20/40     (2022.01)

(52) U.S. Cl.
CPC ............ H04N 5/272 (2013.01); G06V 20/41 (2022.01); H04N 5/23238 (2013.01); H04N 7/183 (2013.01); G06V 20/44 (2022.01)

(58) Field of Classification Search
CPC ...................................... H04N 5/272
USPC .......................................... 348/36
See application file for complete search history.

(56) References Cited

U.S. PATENT DOCUMENTS

| 10,084,972 B2 | 9/2018 | Alm et al. |
| 2002/0054211 A1 | 5/2002 | Edelson et al. |
| 2008/0130949 A1 | 6/2008 | Ivanov et al. |
| 2010/0245583 A1 | 9/2010 | Harel |

(Continued)

FOREIGN PATENT DOCUMENTS

| GB | 2524633 A | 9/2015 |
| WO | 2009/110417 A1 | 9/2009 |

OTHER PUBLICATIONS

Extended European Search Report Received for European Patent Application No. 19214488.9, dated Mar. 4, 2020, 8 pages.

*Primary Examiner* — Daniel T Tekle
(74) *Attorney, Agent, or Firm* — Xsensus LLP

(57) ABSTRACT

There is provided a computer implemented method for displaying a video stream of a scene (100) captured by a video capture device on a display of a client device. The method comprising: detecting a new event (112) in the scene, determining a new event area (114) in the scene within which the new event is detected, checking whether a prior event has been detected within the new event area during a predetermined time period preceding the new event, upon no prior event being detected during the predetermined time period, adding a visual indicator (116) to an image frame (103) temporally corresponding to the detection of the new event and to a number of subsequent image frames (103) of the video stream, wherein the visual indicator coincides with the new event area, and wherein the step of adding the visual indicator comprises gradually changing an appearance of the visual indicator throughout the number of subsequent image frames, and displaying the video stream with the added visual indicator on the display of the client device. There is also provided a related client device and a non-transitory computer-readable storage medium.

14 Claims, 13 Drawing Sheets

(56) References Cited

U.S. PATENT DOCUMENTS

| | | |
|---|---|---|
| 2013/0128050 A1 | 5/2013 | Aghdasi et al. |
| 2015/0286865 A1 | 10/2015 | Mccoy et al. |
| 2016/0217623 A1 | 7/2016 | Singh |
| 2018/0032817 A1* | 2/2018 | Loce .................. G06K 9/00342 |
| 2018/0330591 A1 | 11/2018 | Tilkin et al. |
| 2019/0066310 A1 | 2/2019 | Perry |

* cited by examiner

DISPLAYING A VIDEO STREAM

CROSS REFERENCE TO RELATED APPLICATION

The present application is based on and claims priority of European Patent Application No. 19214488.9 filed on Dec. 9, 2019, the entire contents of which are incorporated herein by reference.

TECHNICAL FIELD

The present invention relates to methods and devices for displaying a video stream with added indicators that indicate events in the video stream to an operator or viewer of the video stream.

BACKGROUND

Monitoring cameras may both prevent crime by deterring potential criminals from criminal actions and provide vital forensic information to investigators about crimes that are nonetheless committed. Monitoring cameras are additionally useful for monitoring potentially hazardous environments such as e.g. a railway crossing for safety purposes. Oftentimes, it is preferable to form large systems of many separate monitoring cameras in order to cover larger areas, not coverable with just one camera. While such a monitoring camera system may provide a large number of video streams that cover everything that is intended to be monitored, the large number of video steams may require significant human resources and attention to actually detect important details within the video streams when viewed on a display. Adding bounding boxes and markers, indicating for example objects or motion, to a video stream may aid a human operator in detecting movement that may otherwise have been missed. However, creating such indicators for all movement may be detrimental for encoding, transmission, and storage of the video stream. Additionally, if a lot of movement is present in the scene covered by the monitoring camera, the operator would inevitably become distracted and fatigued by the constantly appearing new indicators on the display. Thus, the problem with requiring human resources and attention is not really addressed by such a solution. There is thus need for improvements within the technical field.

SUMMARY OF THE INVENTION

One object of the present invention is to conserve computer processing and storage resources. Another object is to improve the prospects of a human operator to detect important events, that are not obvious or perhaps eclipsed by other events, in a video stream.

According to a first aspect there is provided a computer implemented method for displaying a video stream of a scene captured by a video capture device on a display of a client device. The method comprises detecting a new event in the scene; determining a new event area in the scene within which the new event is detected; and checking whether a prior event has been detected within the new event area during a predetermined time period preceding the new event. Upon no prior event being detected during the predetermined time period, the method further comprises adding a visual indicator to an image frame temporally corresponding to the detection of the new event and to a number of subsequent image frames of the video stream, wherein the visual indicator coincides with the new event area. The step of adding the visual indicator comprises gradually changing an appearance of the visual indicator throughout the number of subsequent image frames. The method further comprises displaying the video stream with the added visual indicator on the display of the client device.

The term client device refers to any type of device with a capability to display, or functions associated with displaying, a video stream. The term event may refer to both temporally progressing or momentaneous events. Events may be characterized by e.g. movement in the scene and thus also movement between image frames in the video stream depicting the scene. An event may additionally or alternatively be understood as an object present in the scene being captured by the video capturing device. The object may be an object of interest. The object of interest may be an object of a specific class of object, such as a human, a face, a car, etc. During an event the object is typically present during a plurality of image frames of the video stream of the scene. The term new event may refer to an event being new for a particular image frame compared to a preceding image frame. The new event may then be considered to last for a number of image frames. The term event area may refer to an area within the scene associated with a specific event.

The term temporally corresponding refers to a correspondence in time of, for example, events, indicators, or image frames. In particular, by an image frame that is temporally corresponding to the detection of a new event is meant an image frame that is acquired at the same time as the detection of the new event. The same time is understood to include a time margin since image frames are acquired in a discrete manner, not continuous. The temporally corresponding image frame may thus be understood as the image frame that is acquired closest in time (just before or just after) to the point in time of the detection of the new event.

The inventors have realized that the introduction of requirements for event indication in a video stream may be advantageous for several different reasons. For one, events may be filtered so that only ones suspected of being important or relevant are indicated or highlighted in the video stream. This may conserve computer processing resources and hence reduce requirements of hardware performing encoding and decoding of the video stream. Similarly, storage resources may also be conserved, reducing requirements on computer storage mediums and data transmission channels.

Additionally, the requirements for event indication may reduce the strain on a human operator viewing the video stream and improve the prospects for the operator to detect important or relevant events in the video stream.

An advantage associated with the requirement of having no prior events being detected during the predetermined time period is that events in areas of the video stream that see low event activity, e.g. low levels of motion between image frames, are more likely to pass by without an operator viewing the video stream noticing them. This may be due to the operator being more attentive to more eventful areas of the displayed video.

The feature of indicating events based on a requirement that no events have been detected in the specific area of the video stream during the predetermined time period, at least increases a probability that the human operator will direct attention to the indicated area, even when initially focusing on other areas. This requirement may alternatively be considered a filter for determining which events to add visual indicators for. In general, the methods in this disclosure describing filtering events to be visually indicated provides benefits as, data resource requirements may be reduced, and that operator attention may be more efficiently directed.

The feature of gradually changing the appearance of the visual indicator may further increase the probability that the human operator will direct attention to the indicated area. The gradually changing of the appearance may also provide the human operator with additional info, e.g. an indication of how long time has passed since the event that triggered the indicator occurred and thus aid the human operator in quickly detecting the most recent events.

The method may further comprise determining a duration since a last prior event in the new event area. The number of subsequent image frames and/or the appearance of the visual indicator may be based on the duration.

As such, more unexpected events, occurring in areas with a longer time having passed since the last prior event occurred in the new event area, may be provided with e.g. more notable visual indicators that stay visible for a longer duration and/or have a more pronounced appearance, hence further increasing the probability that the operator will direct attention to the indicated area.

The method may further comprise detecting a separate event ongoing in the scene simultaneously with the new event. Upon the separate event being detected, the method may further comprise determining a separate event area in the scene within which the separate event is detected. The method may further comprise determining a distance between the new event area and the separate event area. The step of adding the visual indicator may be performed upon determining that the distance between the new event area and the separate event area is greater than a predetermined threshold. The separate event may be detected in the scene by the same video capture device that captured the new event or by another video capture device.

An advantageous effect of considering a distance to one or more other events is that new events occurring in close proximity to already ongoing but separate events may be easier for an operator viewing the video stream to detect without requiring a large and alarming visual indicator, further conserving data processing resources. This would be due to the operator, presumably, already directing attention to the separate event area and that the operator therefore would be more likely to detect proximate new events.

The number of subsequent image frames and/or the appearance of the visual indicator may be based on the distance between the new event area and the separate event area.

As such, new events more distant from separate events in the video stream, may be provided with e.g. more notable visual indicators that either last for longer or have a more pronounced appearance, hence further increasing the probability that the operator will direct attention to the indicated area. Alternatively, new events more proximate to separate events, may in some cases be provided with a more pronounced appearance as these events may otherwise be eclipsed by the separate event taking all, or too much, attention of the operator.

The method may further comprise determining a level of motion of the new event. The step of adding the visual indicator may be performed upon determining that (i.e. provided that) the level of motion is greater than a predetermined threshold.

By introducing a requirement for a level of motion of new events, visual indicators may be added based on filtering new motion events based on motion of the event. This may be advantageous in applications where the level of motion is related to the importance or relevance of an event within a video stream. By filtering based on motion, less data resources may be used, and operator attention may be directed more efficiently.

The method may further comprise determining a level of motion of the new event. The number of subsequent image frames and/or the appearance of the visual indicator may be based on the level of motion.

As such, new events with more motion, may be provided with e.g. more notable visual indicators that stay visible for a longer duration and/or have a more pronounced appearance, hence further increasing the probability that the operator will direct attention to the indicated area.

According to some embodiments the method may further comprise determining an object class pertaining to an object associated with the new event. The step of adding the visual indicator may be performed based on the determined object class.

The term object herein refers to any object or structure that may be detected in the video stream. The term object class refers to a way of classifying similar objects into the same class as long as they share a certain number of common features.

According to some embodiments the method may further comprise determining a size of the object associated with the new event. The step of adding the visual indicator may be performed based on the determined size of the object.

The term size may herein refer to the size of an object in the image frames of the video stream or a predicted real-world size of the object. By determination of an object class of an object associated with the new event, further options for optimizing filtering of events and direction of operator attention towards more important or relevant objects are made available. E.g. if a new event is determined to correspond to an object such as a human appearing in the scene, a visual indicator could be added corresponding to the depicted object in the video stream. However, if a new event is determined to correspond to an object such as a bird appearing in the scene, the object may be excluded from receiving a visual indicator in the video stream.

By determination of a size of an object associated with the new event further options for optimizing filtering of events and direction of operator attention towards more important or relevant objects are made available.

The visual indicator may be configured to follow a movement of the new event across subsequent image frames of the video stream.

Such an embodiment may provide improved ability for an operator viewing the video stream to detect and track new events that are moving between subsequent image frames of the video stream.

The step of gradually changing the appearance of the visual indicator may comprise one or more of gradually expanding, gradually fading out, gradually changing form, gradually rotating, and gradually changing a color of the visual indicator throughout the number of subsequent image frames.

Different types of gradually changing the appearance of the visual indicator may serve different purposes and provide an operator viewing the video stream with additional information about the indicated events without necessarily using a text message. Different types of appearance changing may depend on a predicted importance or relevance of the indicated event. The visual indicators may thus be adapted to at least influence the operator to direct a suitable degree of attention to various indicated events, based on e.g. the importance or relevance of the indicated event.

The method may further comprise determining a viewed point of at least one eye of an operator viewing the display. The step of adding the visual indicator may be performed upon determining that the viewed point is outside of the display or upon determining that the viewed point is located a distance from the new event area that is greater than a predetermined threshold.

The term viewed point refers to a detected or predicted spatial point within, or outside of, the display that the eyes of the operator are directed, or focused, at. The viewed point may alternatively be understood as a point of attention of the operator viewing the video stream on the display.

As such, new events may be indicated based on where the operator attention is directed. E.g. new events that are proximate to the viewed point may be excluded from indication while new events far from the viewed point may be indicated by the adding of visual indicators. Thus, filtering of events to be indicated and direction of operator attention is further optimized.

The method may be performed on a live stream, for example a video stream displayed for an operator, or be performed on a recorded stream that is stored for later review. The method may be performed at the time of the recording or later on stored video data. The method is thus not limited to either live streaming/viewing or recorded video data review. According to a second aspect there is provided a non-transitory computer-readable storage medium having stored thereon instructions for implementing the computer implemented method according to the first aspect, when executed on a device having processing capabilities.

Such an aspect provides similar advantages as the first aspect and enabler the computer implemented methods discussed in the above.

According to a third aspect there is provided a client device for displaying a video stream of a scene. The client device comprises control circuitry configured to execute an event detection function configured to detect a new event in the scene. The control circuitry is further configured to execute an event localization function configured to determine a new event area in the scene, corresponding to the area in the scene, within which the new event is detected. The control circuitry is further configured to execute an event comparison function configured to check whether a prior event has been detected within the new event area during a predetermined time period preceding the new event. The control circuitry is further configured to execute an indicator adding function configured to, upon no prior event being detected during the predetermined time period, add a visual indicator to an image frame and to a number of subsequent image frames of the video stream. The visual indicator coincides with the new event area. The indicator adding function is further configured to gradually change an appearance of the visual indicator throughout the number of subsequent image frames. The control circuitry is further configured to execute a display function configured to display the video stream with the added visual indicator on a display of the client device.

The functions described herein, may refer to devices that physically perform the functions which they are configured for. The functions may alternatively be realized as instructions, stored on a computer-readable storage medium, that may be executed or implemented by a computer or a device with processing capability.

Such an aspect, relating to a client device for displaying a video stream, features similar purposes and advantages as those of the first aspect.

According to a fourth aspect there is provided a system comprising a client device according to the third aspect and a video capture device.

Such a system including a camera enables the advantageous use of the client device for a video monitoring/surveillance system that feeds a captured video stream from the video capture device to a client device where it may be displayed to a human operator.

The video capture device, in any of the disclosed aspects, may be a monitoring camera for wide-angle imaging, panoramic imaging, or 360-degree imaging, or be part of a plurality of video capture devices which jointly perform any of the mentioned kinds of imaging.

The system according to the fourth aspect may be particularly advantageous in covering wide, large, and/or panoramic scenes. Monitoring cameras may often be required to cover such scenes, sometimes at the cost of detectability of events in the scenes. As such, the system, also including the client device that adds visual indicators, may aid in covering large scenes without sacrificing detectability of events or at least mitigating the issue of lost detectability.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. It is further noted that the invention relates to all possible combinations of features unless explicitly stated otherwise.

Hence, it is to be understood that this invention is not limited to the particular component parts of the device described or acts of the methods described as such device and method may vary. It is also to be understood that the terminology used herein is for purpose of describing particular embodiments only and is not intended to be limiting.

BRIEF DESCRIPTION OF THE DRAWINGS

The above and other aspects of the present invention will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout. Step boxes bordered by a dashed line in flow charts indicate that the step is optional for the illustrated embodiment.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person. In addition to the specifically disclosed embodiments herein, any combination of the embodiments is also possible unless explicitly stated that this is not the case.

An embodiment of the invention will now be disclosed with reference to FIG. 1 and FIGS. 2a-d.

Figure 1:
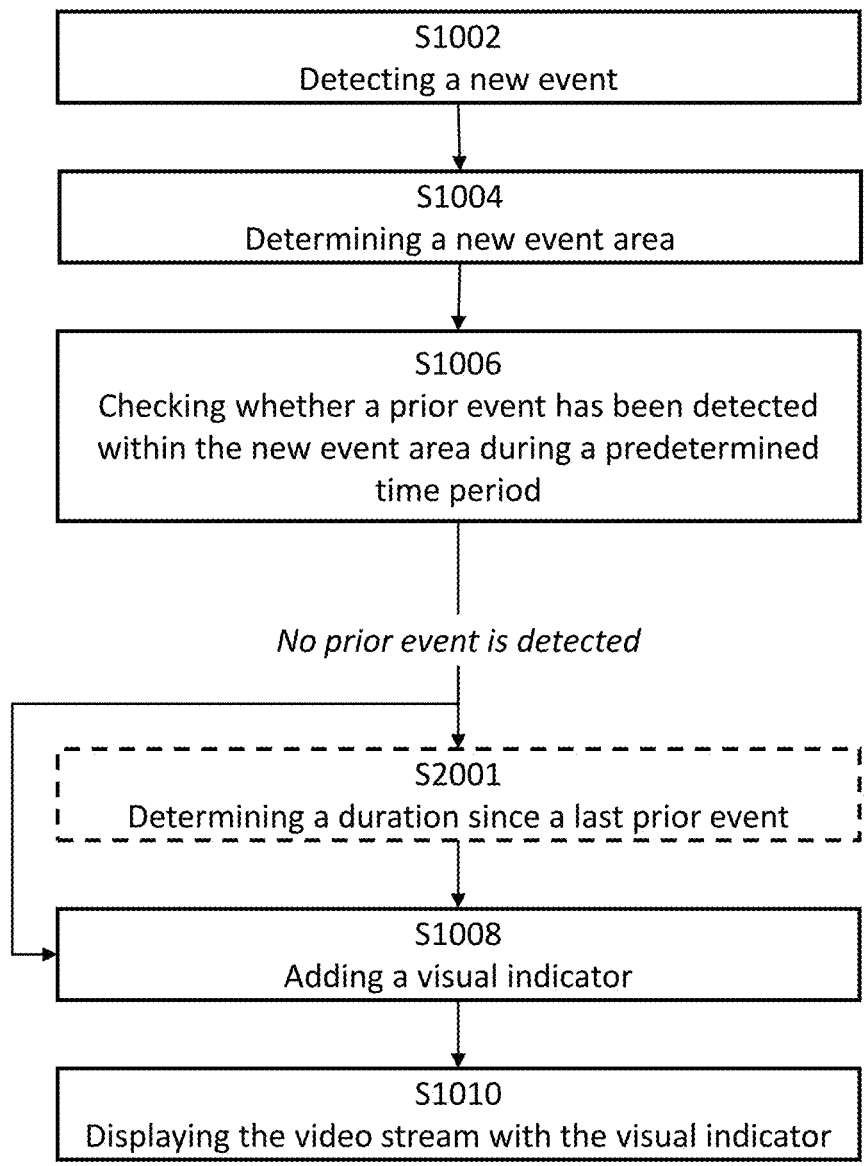
FIG. 1 shows a flow chart of a method of displaying a video stream with a visual indicator.

There is provided a computer implemented method for displaying a video stream depicting a scene 100 captured by a video capture device on a display 101 of a client device. FIG. 1 provides a step-by-step walkthrough of the method. Please note that the disclosed order of the steps in this disclosure, in particular the figures, are only intended as a non-limiting example. The steps may be performed in other orders than those disclosed or illustrated.

As shown in FIG. 1, the method comprises detecting S1002 a new event 112 in the scene 100. The step of detecting S1002 a new event 112 may be algorithm based and performed by means of computer image analysis, motion detection, object recognition, radar detection (e.g. doppler radar), etc. Please note that the term video stream refers to a depiction of the scene 100. Thus, these terms should be considered interchangeable herein.

The video stream comprises a plurality of image frames 103. Each image frame 103 corresponds to a discrete point in time when that particular image frame 103 was captured. The video stream may feature a particular number of image frames 103 per second (FPS). Preferably, the number of FPS is in the range 1-100, more preferably, it is in the range 10-60, and most preferably, it is in the range 20-30. The image frames 103, and thus also the video stream, may represent a panoramic view, stitched images, or 360-degree images of the scene 100.

The new event 112, and generally other types of events described herein, may be either temporally progressing (i.e. span at least two image frames) or momentaneous (i.e. occur in just one image frame). An event may relate to an instantaneous/sudden event or a more gradual/drifting event. Events may relate to motion between subsequent image frames in the video stream. Such motion may be described as larger objects, depicted by a large number of pixels, moving in the video stream or the smallest possible movement, exemplified by a single pixel changing its color value, and anything in-between. The new event 112 may not necessarily be new within a context of a full duration of the video stream. The new event 112 may be new in a temporally relative context compared to prior events. More than one new event 112 may be detected S1002 within a single image frame 103.

Events may also refer to non-visible events in the video stream. Such events may still be motion but detected by e.g. a radar capture device also covering the scene 100, i.e. having a same, or at least overlapping, field of view. The method further comprises determining S1004 a new event area 114 in the scene 100 within which the new event 112 is detected. The new event area 114 may correspond, in size or location, to the new event 112 in the video stream.

The new event area 114 may e.g. correspond to an area outlined by the pixels, associated with the new event 112, that have moved between image frames 103 associated with the new event 112. The new event area 114 may correspond to an arbitrary geometric shape, not necessarily corresponding in size or location with the new event 112. The new event area 114 may include a padding area in addition to the actual spatial extent of the detected S1002 new event 112 in the image frame 103. Spatial extent may, throughout this disclosure, refer to an area in the image frames corresponding to a particular event such as the new event 112. Spatial extent may also be used for other types of events disclosed herein. The new event area 114 may thus include some of the background typically representing stationary scene areas. More than one new event area 114 may be determined S1004 within a single image frame 103.

The new event area 114 may be configured to follow the new event 112 if the new event 112 is determined to be moving, between subsequent image frames 103. This may be the case either due to the actual new event 112 moving in the scene 100 or due to camera motion, such as panning, tilting, translating, zooming, or focusing.

The method further comprises checking S1006 whether a prior event has been detected within the new event area 114 during a predetermined time period preceding the new event 112. A prior event may e.g. be understood as an event that may have been a new event 112 at a previous point in time.

The step of checking S1006 for prior events may comprise analyzing a list, an array, or a lookup table to find prior events stored therein. The method may, to this end, further comprise storing new events 112 into a list, an array, or a lookup table for future reference as prior events. Prior events may only be stored temporarily in the list, array, or lookup table, as to conserve data storage resources.

Further non-limiting alternatives for the step of checking S1006 include analyzing/searching through the video stream, starting from the current frame and progressing backwards in time during the predetermined time period 120. If no prior event is found, the visual indicator 116 may be added S1008. If a prior event is found, the analysis/search may be aborted early to save computer processing resources. As a prior event has been found in this case, a step of adding the visual indicator should not be performed.

Prior events may additionally refer to continuous or intermittently occurring events in the video stream. Prior events may originally have been detected in similar ways as other events such as e.g. the new event 112. The predetermined time period may refer to a time, or a corresponding number of subsequent frames. The predetermined time period may be, preferably in the range 1-3600 seconds, more preferably in the range 5-300 seconds, and most preferably in the range 5-60 seconds.

The wording, whether a prior event has been detected within the new event area 114, may alternatively be understood as, whether a prior event has been detected that corresponds to the new event area 114. This correspondence may e.g. be understood as the spatial extent (within the image frames 103) of the prior event and the new event area 114 overlap at least partially. The same may also understood as the prior event and the new event area 114 substantially corresponding to each other in regard to location, size, shape, or any combination of the aforementioned. E.g. a tiny new event detected within, or overlapping with, a larger area prior event may still be important or relevant. Indicating such events may prevent them from being eclipsed by larger events in the video stream. Prior events may be detected in the scene by the same video capture device that captured the new event 112 or by another video capture device.

Upon no prior event being detected during the predetermined time period, the method further comprises adding S1008 a visual indicator 116 to an image frame 103 temporally corresponding to the detection of the new event 112 and to a number of subsequent image frames 103 of the video stream. The image frame 103, to which the visual indicator 116 is added S1008, and the subsequent images frames 103 may comprise the new event 112.

The visual indicator 116 may coincide with the new event area 114. The visual indicator 116 may correspond, in size or location, to the new event 112 in the video stream.

The visual indicator 116 may be configured to appear as e.g. a crosshair or a marker overlaid to the image frames 103 of the video stream. The figures, e.g. FIGS. 2b-d, show the visual indicator 116 being configured as a crosshair. Various alternative configurations of the visual indicator 116 are available. The visual indicator 116 may essentially be configured as an arbitrary geometric shape or object. The visual indicator 116 may in some cases comprise text or characters. The visual indicator 116 may feature an appearance that is configured to be gradually changed throughout the number of subsequent image frames 103.

The visual indicator 116 may be configured to have a visual appearance that attracts the visual attention of an operator viewing the video stream to the new event 112 indicated by the visual indicator 116. The visual indicator 116 may be configured to not obstruct the view of, or hide, the new event 112 being indicated. Some overlap between the visual indicator 116 and the new event 112 may be acceptable. The image frames 103 (or the video stream) may be configured with exclusion areas, in which visual indicators are not added.

The visual indicator 116 may be monochromatic or polychromatic. The visual indicator 116 may feature only one absolute color e.g. 100% black (RGB 0, 0, 0), or 100% white (RGB 255, 255, 255). The visual indicator 116 may be colored to provide an adequate level of contrast toward a current background of the image frame 103, in particular toward a current background area located around the new event 112. The visual indicator 116 may feature a blinking behavior between subsequent image frames forming, e.g., a stroboscopic appearance for particularly important and urgent new events 112.

The step of adding S1008 the visual indicator 116 comprises gradually changing an appearance of the visual indicator 116 throughout the number of subsequent image frames 103.

The step of gradually changing the appearance of the visual indicator 116 may comprise one or more of gradually expanding, gradually fading out (i.e. becoming transparent), gradually changing form, gradually rotating, and gradually changing a color of the visual indicator 116 throughout the number of subsequent image frames 103. The step of gradually changing the appearance of the visual indicator 116 may further comprise one or more of gradually making its lines thicker or thinner, gradually shrinking, gradually fading in.

Gradually changing may be understood as slightly changing the appearance of the visual indicator 116 for each image frame 103, relative to a preceding image frame. It may also be understood as changing the appearance of the visual indicator 116 in steps corresponding to a plurality of image frames 103. Generally, the step of gradually changing the appearance of the visual indicator 116, means to change the appearance in a consistent way throughout the number of subsequent image frames 103. The gradual change of the appearance of the visual indicator 116 may include changing values for e.g. color of pixels or transparency according to linear, exponential, or logarithmic functions.

An example of gradually changing the appearance of the visual indicator 116, by fading it out, may be understood as the visual indicator 116 being 0% transparent in a first image frame, the visual indicator 116 being 50% transparent in a fifth image frame, and the visual indicator 116 being 100% transparent in a tenth image frame.

The method further comprises displaying S1010 the video stream with the added visual indicator 116 on the display 101 of the client device. In general, the steps of this disclosure may at least be performed in part by a device with processing capacity e.g. the client device. The displaying step S1010 may be performed by a display 101 of the client device.

The video stream may be one of a plurality of video streams. The display 101 may be adapted for viewing of the plurality of video streams. The display 101 may be one of a plurality of displays. The display 101 may be a display viewed by, or intended to be viewed by, a professional monitoring camera operator.

As indicated by the optional step (having a dashed border) in FIG. 1, different embodiments may further comprise determining S2001 a duration since a last (i.e. most recent) prior event in the new event area 114. The number of subsequent image frames 103 and/or the appearance of the visual indicator 116 may be based on the determined duration.

E.g. if the duration since the last prior event is determined to be longer, the visual indicator 116 may be kept in the video stream for a larger number of subsequent image frames 103. Additionally, or alternatively, the appearance of the visual indicator 116 may be adapted to be more noticeable for an operator viewing the video stream.

Figure 2A:
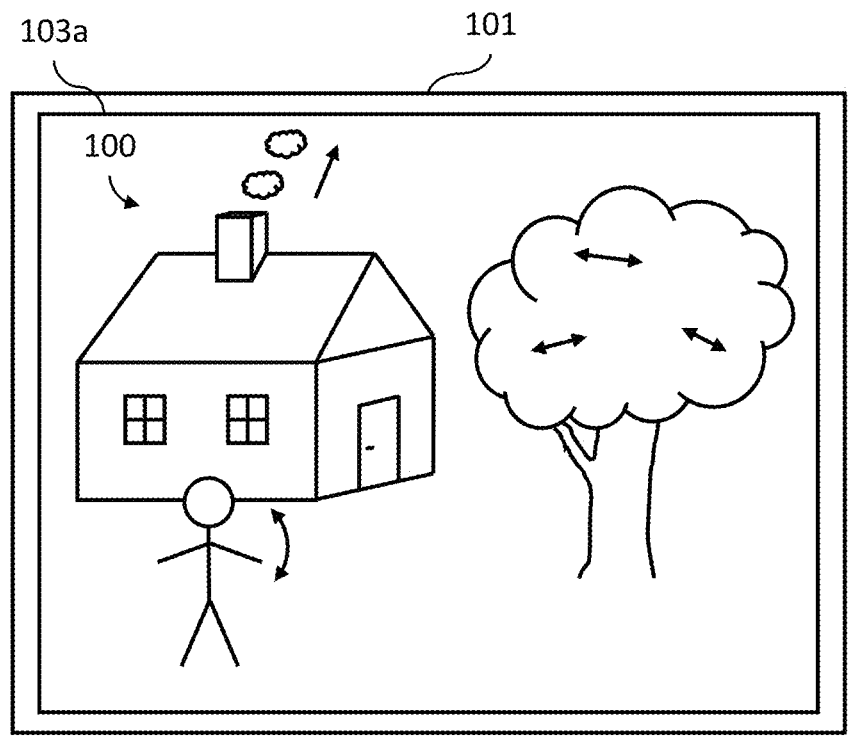
FIGS. 2a-d illustrate four different image frames of a video stream and how visual indicators may be added based on events occurring therein.
Figure 2B:
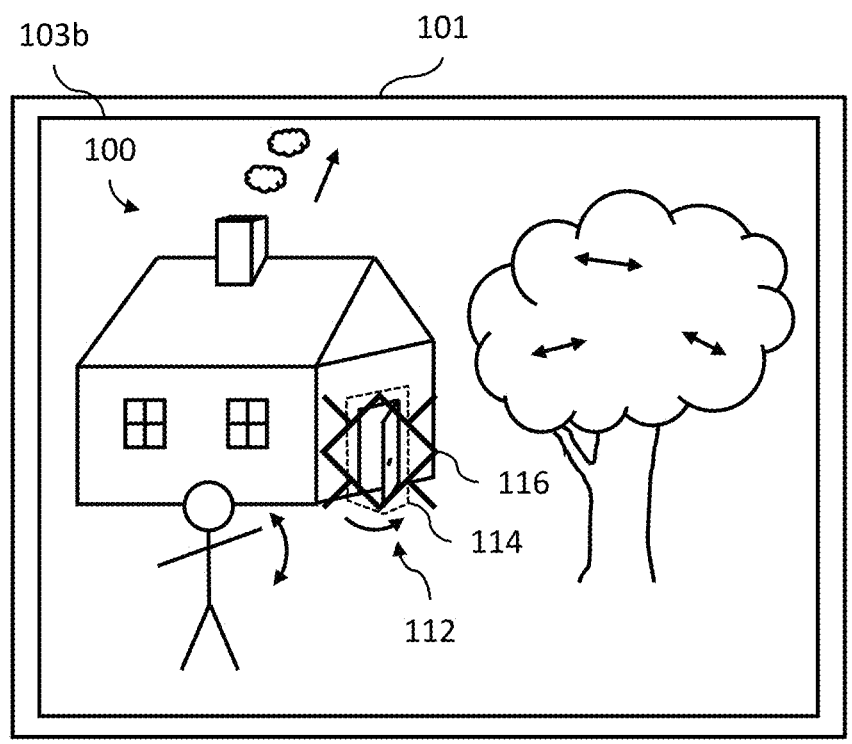
Figure 2C:
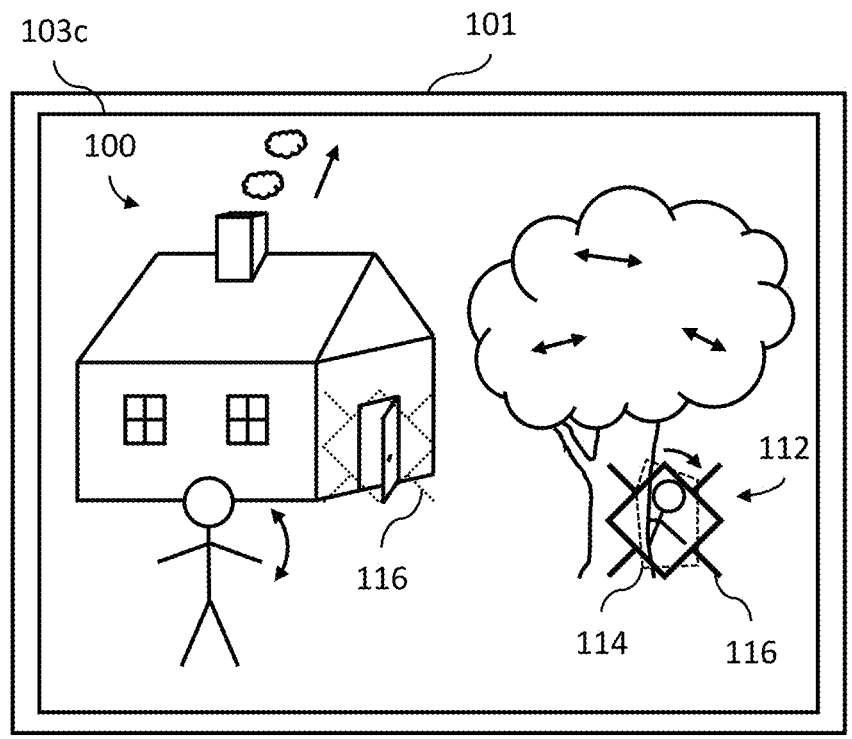
Figure 2D:
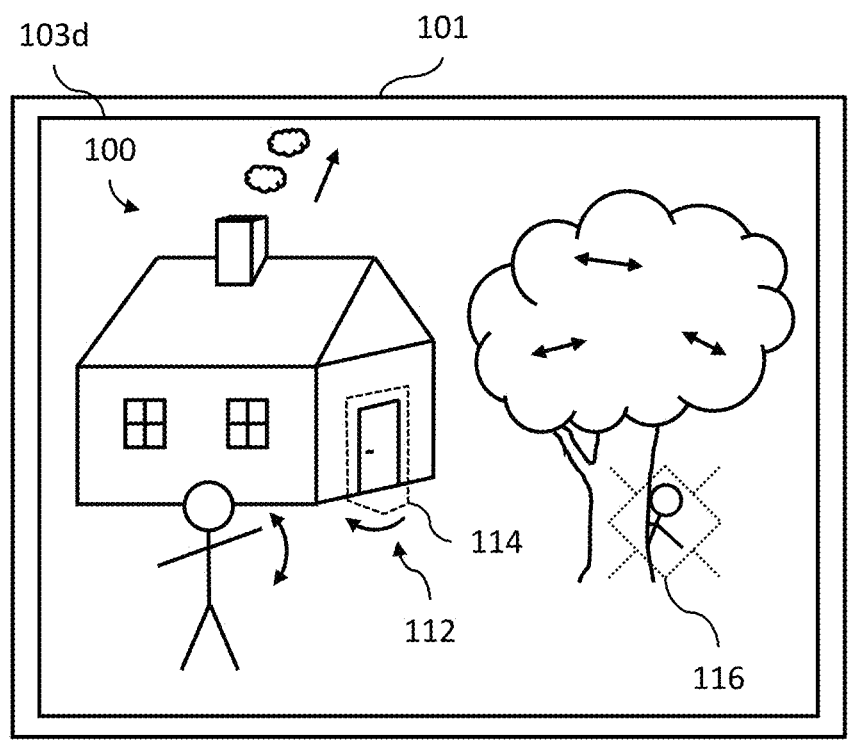

Going more into details of the embodiment illustrated in FIGS. 2a-2d, the illustrated images frames 103a-d are chronologically ordered image frames of the video stream, with FIG. 2a being the first image frame 103a and FIG. 2d being the last image frame 103d. The image frames 103a-d in the examples of FIGS. 2a-d, are not necessarily directly subsequent, or chronologically adjacent to each other, in the video stream. The image frame 103a of FIG. 2a, and its depicted events, may be understood as preceding the image frame 103b of FIG. 2b by e.g. 1 second or 30 image frames in the video stream. This may also be the case for the other figures herein, depicting image frames 103, at separate points in time. FIG. 2a shows an image frame 103a depicting the scene 100 comprising a house, a tree, and a person. The bold arrows present in FIGS. 2a-d, as well as in later figures, indicate an event by motion in the scene. This is exemplified by smoke puffs, ascending into the sky from a chimney of the house, by leaves and branches of the tree, swaying in the wind, and by the person, moving an arm up and down. It should be noted that all events in the scene, including these, may be detected as new events, thus also prompting the determination of new event areas. However, a visual indicator is added only after, or provided that, it has been determined that no prior event has been detected during a preceding predetermined time period. These events may all be preceded by prior events, as they are ongoing, and thus, no visual indicator is added in FIG. 2a.

FIG. 2b shows an image frame 103b depicting the scene 100, at a later point in time, than the image frame 103a of FIG. 2a. This image frame 103b may be, but is not required to be, a directly subsequent image frame 103a to the one in FIG. 2a. In FIG. 2b, a door of the house has been opened. As disclosed, this event is detected S1002 as a new event 112, because of the motion related to the opening of the door. The new event area 114 is determined S1004 as the dashed area encompassing the door. In the example of FIG. 2b, the check S1006, whether prior events have been detected within the new event area 114 during the predetermined preceding time period, comes back negative, and a visual indicator 116, is added S1008 to the image frame 103b.

FIG. 2c shows an image frame 103c depicting the scene 100, at a later point time, than the image frame 103b of FIG. 2b. A notable change in this later image frame 103c is that the visual indicator 116 indicating the opened door has had its appearance changed since FIG. 2b. This visual indicator 116 now appears to feature thin dashed lines instead of the thick solid lines from of FIG. 2b. This may be understood as e.g. the visual indicator 116 being gradually faded out. Another change in FIG. 2c is the person appearing behind the tree trunk. This may be understood as another new event 112 being detected S1002. Another new event area 114 is also determined S1004. The check S1006, whether prior events have been detected within the new event area 114 during the predetermined preceding time period, once again comes back negative and another visual indicator 116, is added S1008 to the image frame 103c.

FIG. 2d shows an image frame 103d depicting the scene 100, at a later point in time, than the image frame 103c of FIG. 2c, The visual indicator 116 indicating the person behind the tree trunk has had its appearance changed, as previously described in the example of FIG. 2c. Other than that, a new event 112 is detected S1002 as the door once again closes. Another new event area 114 is determined S1004 but this time, no visual indicator is added. This is due to the check S1006, whether prior events have been detected within the new event area 114 during the predetermined preceding time period, comes back positive. This is the case because of the event associated with the door being opened in FIG. 2b and because the time between the image frame 103b in FIG. 2b to the image frame 103d of FIG. 2d is less than the predetermined time period. The door being opened in FIG. 2b thus forms a prior event during the predetermined preceding time period for the door being closed in FIG. 2d.

Figure 3A:
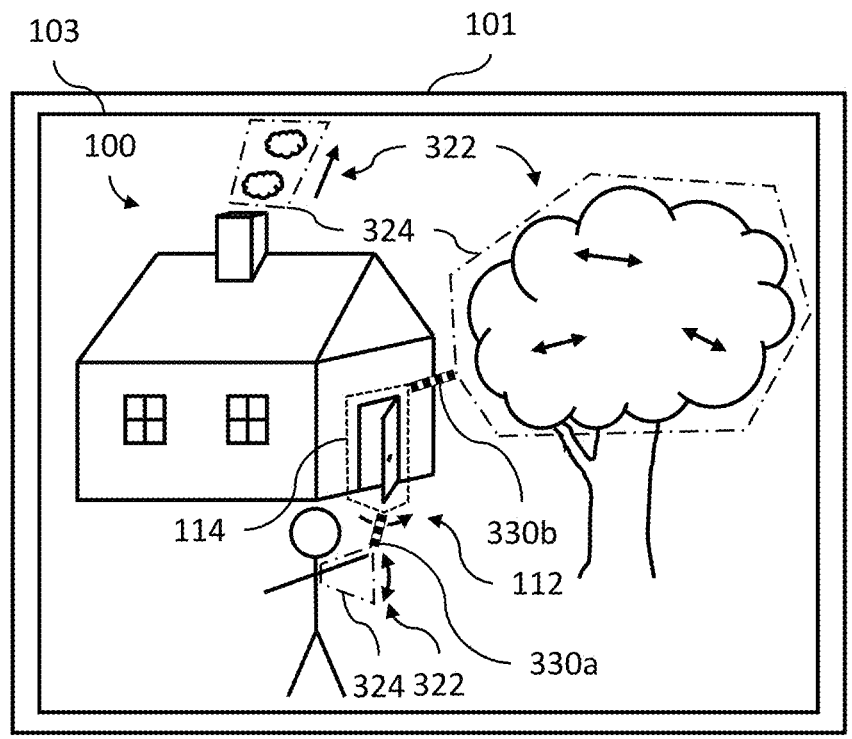
FIGS. 3a-b illustrate how visual indicators may be added based on a distance between new and other ongoing separate events.
Figure 3B:
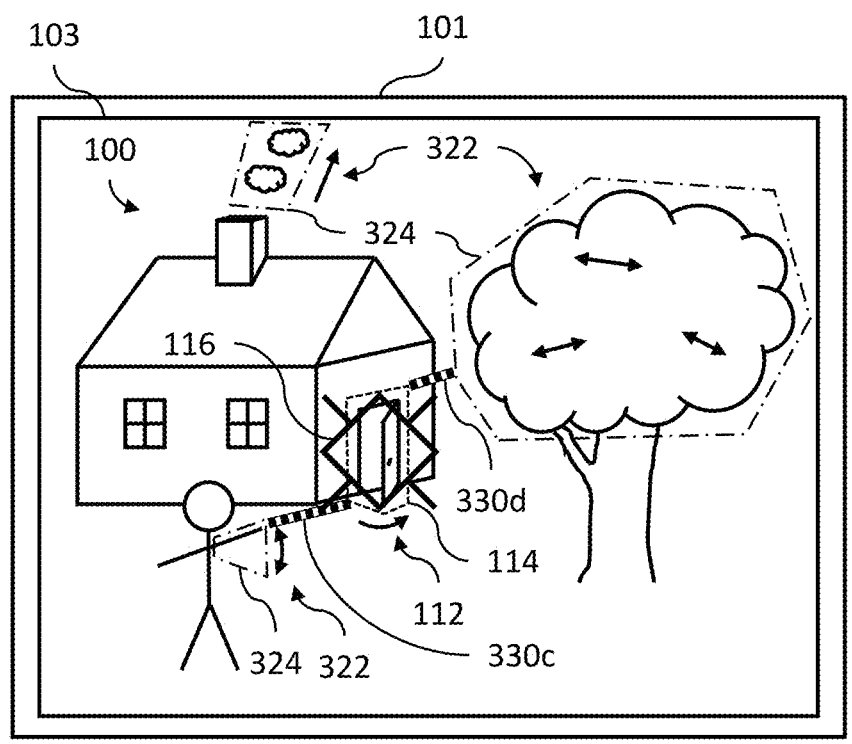
Figure 4:
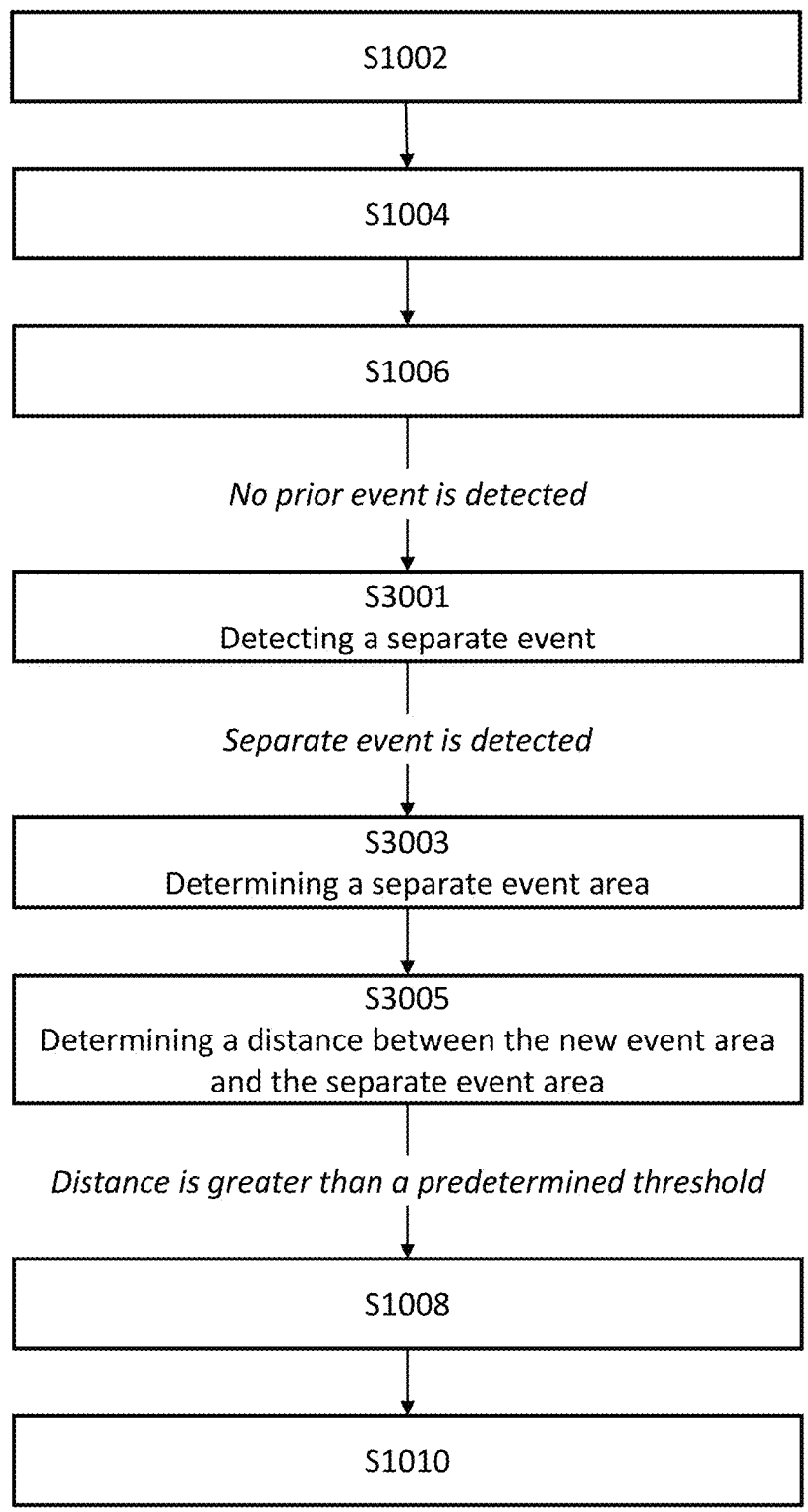
FIG. 4 shows a flow chart of a method of displaying a video stream with a visual indicator based on a distance between new and other separate events.

With reference to FIGS. 3a-b and FIG. 4, different embodiments of the method, comprising further steps, will now be disclosed. FIGS. 3a-b provide an illustrated example of how the further steps relate to events and features of an image frame 103 while FIG. 4 provides a step-by-step walkthrough of the method of these embodiments.

As shown in FIG. 4, different embodiments may further comprise detecting S3001 a separate event 322 ongoing in the scene 100 simultaneously with the new event 112. The separate event 322 may be described similarly to how the new event, or events in general, has been described in the above. More than one separate event 322 may be detected S3001 within a single image frame 103. Upon the separate event 322 being detected, the method may further comprise determining S3003 a separate event area 324 in the scene 100 within which the separate event 322 is detected. More than one separate event area 114 may be determined S3003 within a single image frame 103.

The separate event area may e.g. correspond to an area outlined by the pixels, associated with the separate event 322, that have moved between image frames 103. The separate event area 324 may alternatively correspond to an arbitrary geometric shape, not necessarily corresponding in size or location with the separate event 322. The separate event area 324 may correspond to a previous new event area 114.

The method may further comprise determining S3005 a distance 330 between the new event area 114 and the separate event area 324.

The distance 330 may correspond to a distance within the planar image frame 103 depiction of the scene 100. The distance 330 may e.g. be determined as the closest distance between the borders of the event areas 114, 324 as shown by the examples of FIGS. 3a-b. The distance 330 may alternatively be determined as the distance between central points of the event areas 114, 324. The distance 330 may yet alternatively be determined as the furthest distance between the borders of the event areas 114, 324 or combinations of the above examples. The distance 330 may be determined in a coordinate system of the image frame 103.

The distance 330 may alternatively correspond to a predicted or evaluated real-world distance between events in the scene 100, i.e. distance in the actual scene 100. Such evaluation may provide a depth aspect to the distance 330 which may be advantageous as the focus settings of a video capture device may affect the depiction quality of features in the scene 100 differently depending in their distance to the video capture device. The distance 330 may be determined by, for example, computer image analysis or by an external sensor adapted to measure distance, for example a radar device.

The step of adding S1008 the visual indicator 116 may be performed upon determining that the distance 330 between the new event area 114 and the separate event area 324 is greater than a predetermined threshold.

An alternate approach would be to add S1008 the visual indicator 116 upon determining that the distance 330 between the new event area 114 and the separate event area 324 is smaller than a predetermined threshold. Such an embodiment may mitigate the issue of separate events 322 eclipsing new events 112 proximate to, or overlapping, the separate event area 322.

The number of subsequent image frames 103 and/or the appearance of the visual indicator 116 may be based on the distance 330 between the new event area 114 and the separate event area 324.

E.g. if the distance to a closest separate event 322 is determined to be longer, the visual indicator 116 may be kept in the video stream for a larger number of subsequent image frames 103. Additionally, or alternatively, the appearance of the visual indicator 116 may be adapted to be more noticeable for an operator viewing the video stream.

A wide range of different image frame 103 sizes are possible. For this reason, the predetermined threshold may be considered as a percentage of the diagonal distance of the image frame 103. Preferably, the predetermined threshold for the distance is in the range from 1-50%, more preferably, the predetermined threshold for the distance is in the range from 5-30%, and most preferably, the predetermined threshold for the distance is in the range from 10-20%.

FIGS. 3a-b show that the puffs of smoke from the chimney, the trees leaves and branches, and the person's moving arm may all be detected S3001 as separate events 322. Separate event areas 324 for the separate events have been determined S3003, respectively. The door of the house being opened is detected S1002 as a new event 112 and a new event area 114 is determined S1004 around it.

In FIG. 3a, two distances 330a-b are illustrated. The first distance 330a is that between the separate event area 324, corresponding to the person's moving arm, and the new event area 114 of the door. This distance 330a is less than the predetermined threshold. The second distance 330b is that between the separate event area 324, corresponding to the trees moving leaves and branches, and the new event area 114 of the door. This distance 330b is greater than the predetermined threshold. As one of the distances, i.e. the first distance, is less than the predetermined threshold, no visual indicator is added.

In FIG. 3b, two distances 330c-d are illustrated. The first distance 330c is that between the separate event area 324, corresponding to the person's moving arm, and the new event area 114 of the door. As the person is now further away from the door, this distance 330c is greater than the predetermined threshold. The second distance 330d is that between the separate event area 324, corresponding to the trees moving leaves and branches, and the new event area 114 of the door. This distance 330d, being the same as the distance 330b in the case of FIG. 3a, is still greater than the predetermined threshold. As both distances 330c-d are greater than the predetermined threshold, a visual indicator 116 is added S1008 to the image frame 103.

It should be noted that the embodiments of FIG. 3a-3b are disclosed above from a perspective where the new event 112 is the opening of the door in the scene 100, and that other simultaneously occurring events form separate events 322. However, each separate event 322 also form a new event that is evaluated in the same manner as the new event 112 and may be provided with a visual indicator if the discussed conditions are fulfilled.

Figure 5A:
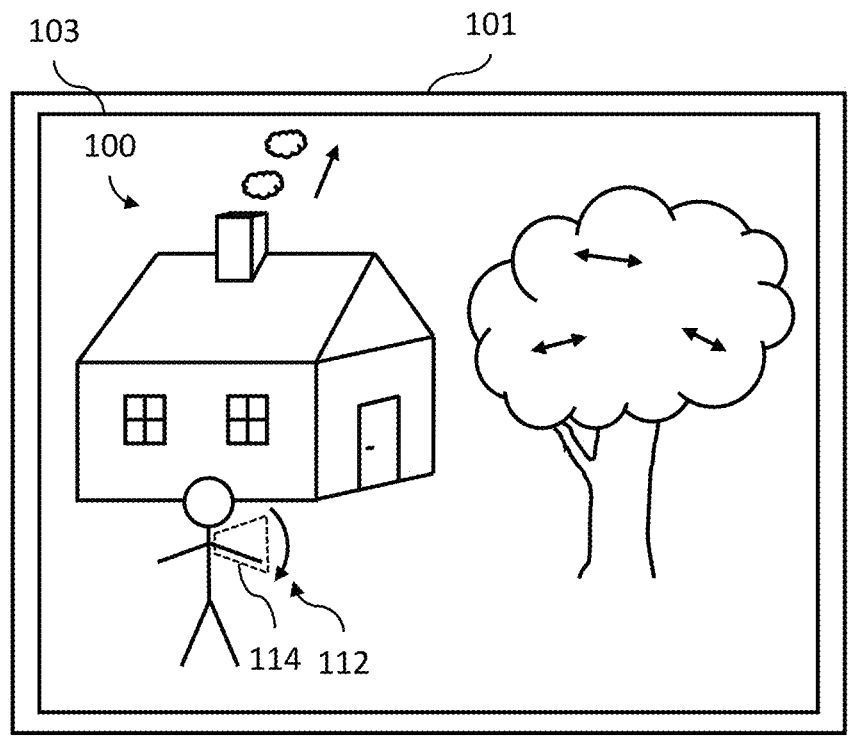
FIGS. 5a-b illustrate how visual indicators may be added according to a level of motion of new events.
Figure 5B:
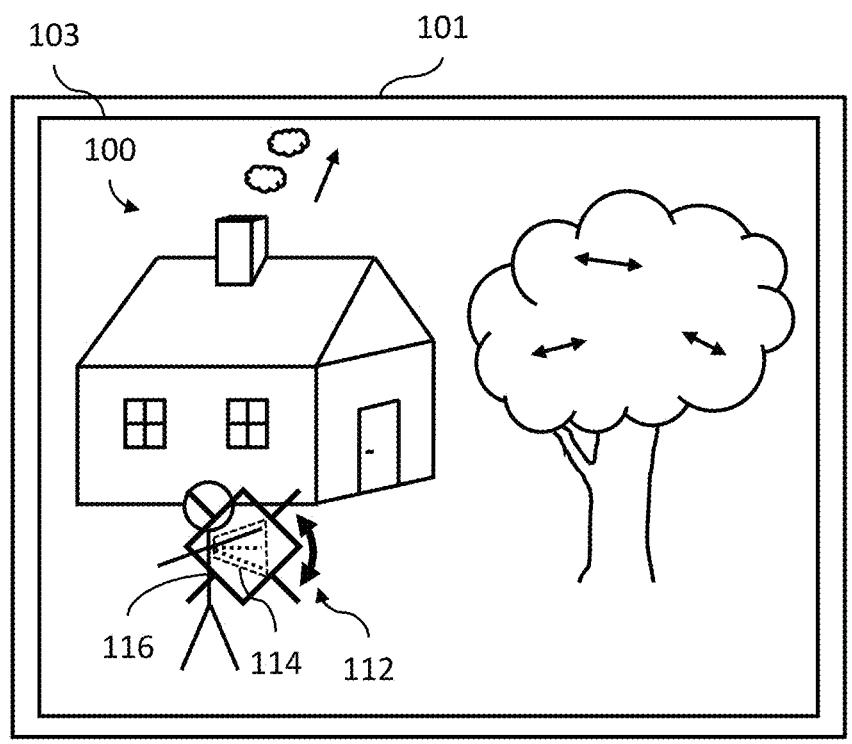
Figure 6:
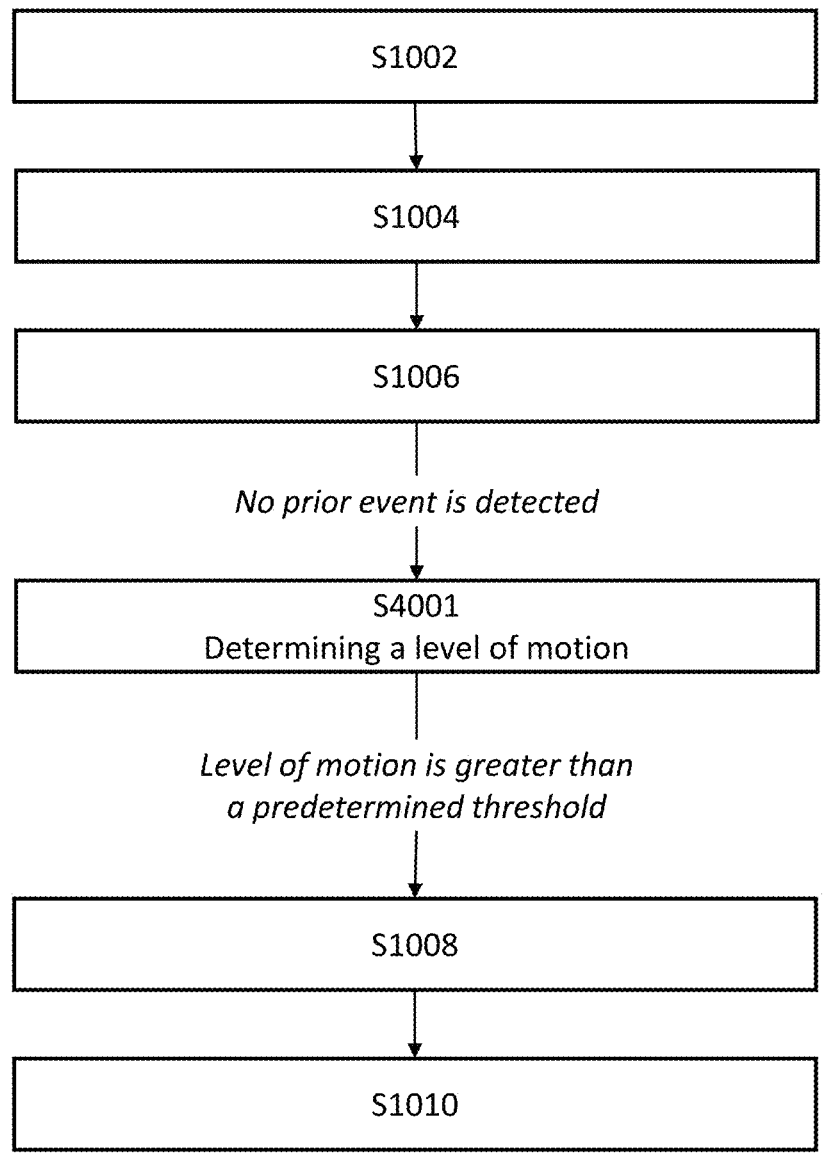
FIG. 6 shows a flow chart of a method of displaying a video stream with a visual indicator based on a level of motion of new events.

In connection with FIGS. 5a-b and FIG. 6, different embodiments of the method, that comprises a further step concerning establishing a level of motion, will now be disclosed. FIGS. 5a-b provide illustrated examples of how the further step relates to events and features of an image frame 103 while FIG. 6 provides a step-by-step walkthrough of the method of these embodiments.

As shown in FIG. 6, different embodiments may further comprise determining S4001 a level of motion of the new event 112. The step of adding S1008 the visual indicator 116 may be performed upon determining that the level of motion is greater than a predetermined threshold.

The level of motion may refer to a numerical value pertaining to the detected or perceived motion in a new event area 114 for subsequent image frames 103. E.g. the level of motion may refer to a percentage of pixels within the new event area 114 that have seen a change to their color value more than a predetermined amount. The level of motion may be determined using computer image analysis, motion detection, radar analysis, etc.

FIGS. 5a-b show simple examples of this level of motion filter in action. In FIG. 5a, it is shown that the person's arm, moving up and/or down, is detected S1002 as a new event 112 in the scene 100 and that a corresponding new event area 114 is determined S1004. However, no visual indicator is added as the determined S4001 level of motion of the new event 112 is determined to be smaller than the predetermined threshold for level of motion.

FIG. 5b shows the same situation but with the motion of the person's arm being substantially quicker. Thus, the determined S4001 level of motion is determined to be greater than the predetermined threshold for level of motion. As such, a visual indicator 116 is added S1008 to the image frame 103 and subsequent image frames 103. The number of subsequent image frames 103 and/or the appearance of the visual indicator 116 may be based on the level of motion in similar ways to the duration and distance-based aspects disclosed in the above.

The predetermined threshold for level of motion may be determined by a user/operator that views the images.

Figure 7A:
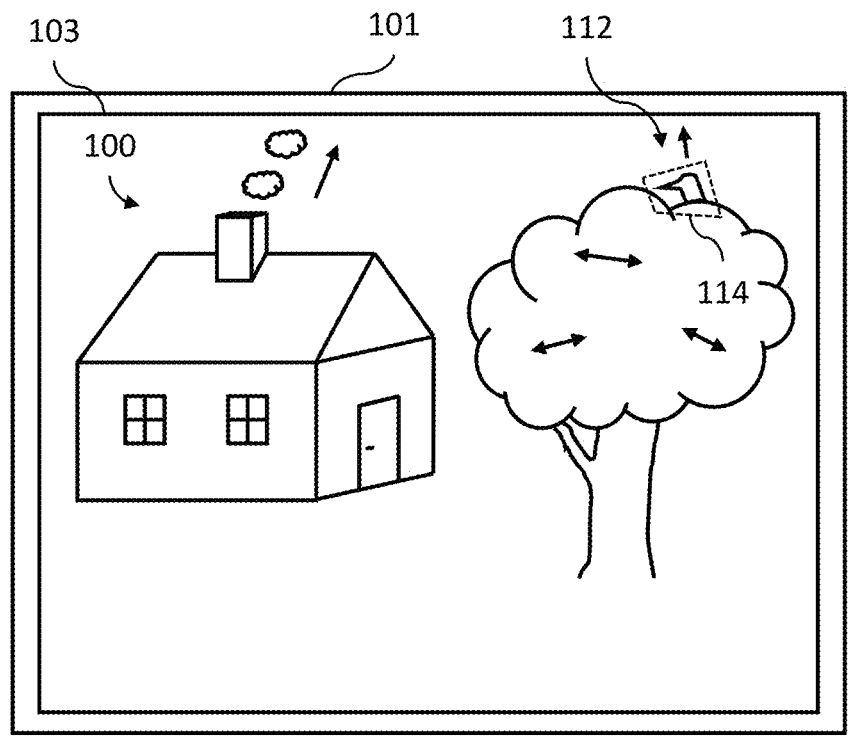
FIGS. 7a-b illustrate how visual indicators may be added according to object class, or size, of objects associated with new events.
Figure 7B:
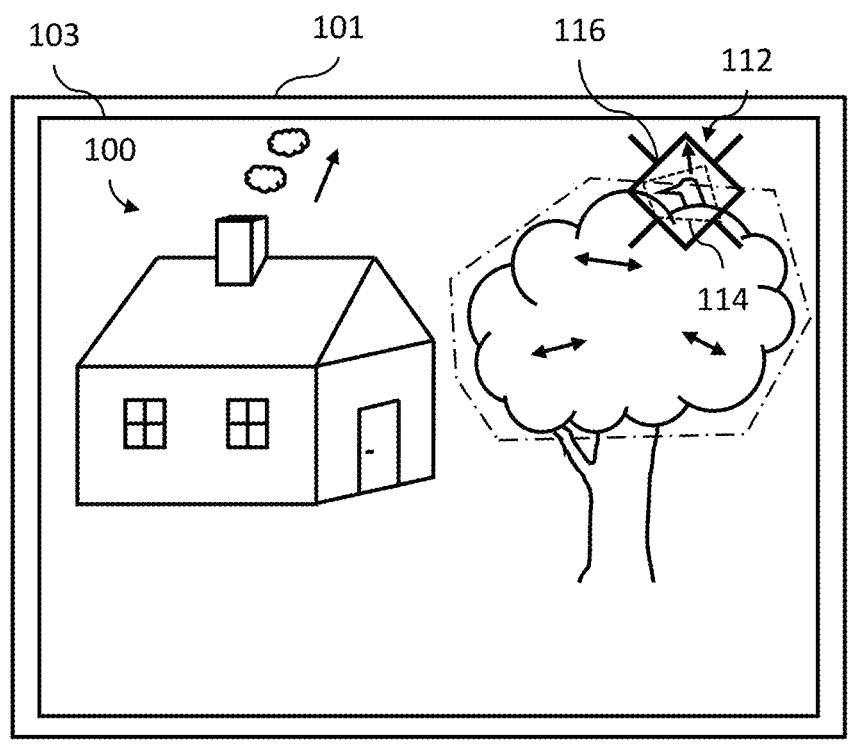
Figure 8:
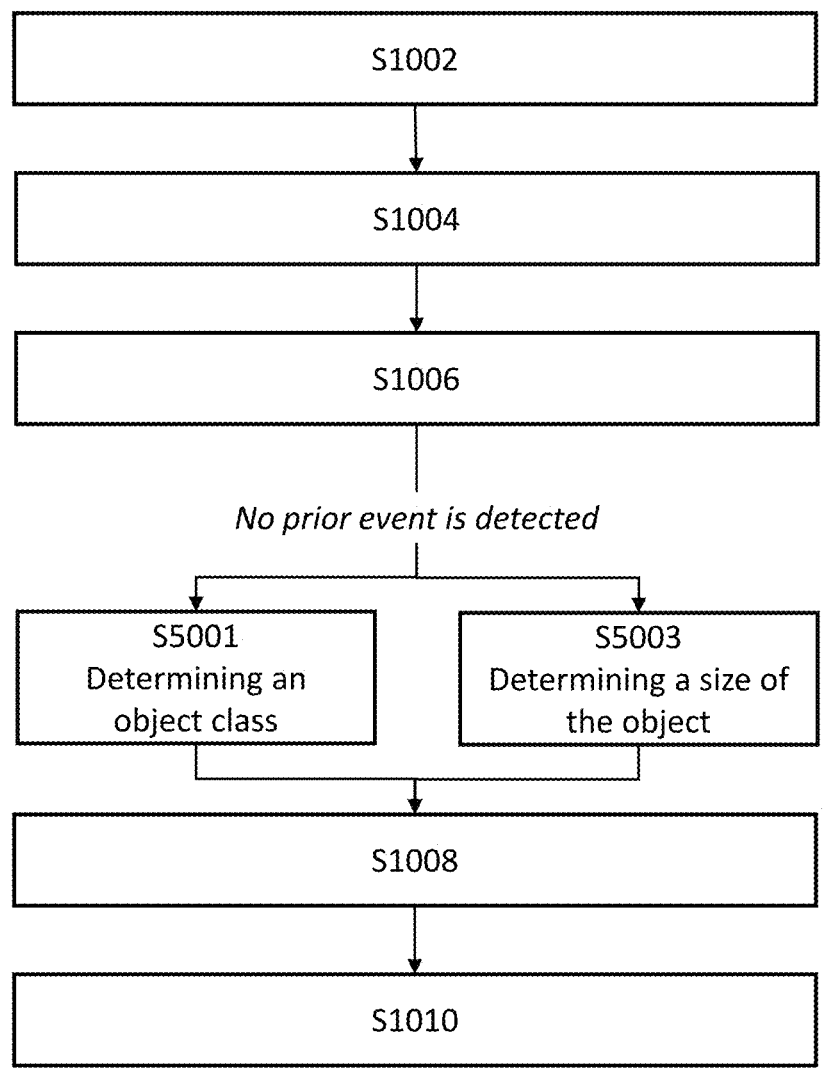
FIG. 8 shows a flow chart of a method of displaying a video stream with a visual indicator based on object class, or size, of objects associated with new events.

In connection with FIGS. 7a-b and FIG. 8, different embodiments of the method, that comprises further steps concerning detection and size determination of objects, will now be disclosed. FIGS. 7a-b provide illustrated examples of how these further steps relate to events and features of an image frame 103 while FIG. 6 provides a step-by-step walkthrough of the embodiment.

As shown in FIG. 8, different embodiments may further comprise determining S5001 an object class pertaining to an object associated with the new event 112. The step of adding S1008 the visual indicator may be performed based on the determined object, meaning that the visual indicator will be added for some predefined object types but not for other.

As also shown in FIG. 8, different embodiments may further comprise determining S5003 a size of the object associated with the new event 112. The step of adding S1008 the visual indicator may be performed based on the determined size of the object, meaning that the visual indicator may be given a different appearance for different sized objects.

The number of subsequent image frames 103 and/or the appearance of the visual indicator 116 may be based on the determined object class and/or the determined size of the object in similar ways to the duration and distance-based aspects disclosed in the above. In general, more important, relevant, or likely to be missed, new events 112, may be provided with e.g. more notable visual indicators 116 that last for longer and/or have a more pronounced appearance, hence further increasing the probability that a human operator will direct attention to the indicated area.

As previously defined, an object class refers to any group of objects that share a certain number of common features. Some examples of potential object classes include humans, faces, vehicles, cars, smoke/fumes, fire, animals, birds, geometric shapes, etc. The size of an object may refer to the actual size of an object in the video stream or a predicted real-world size of the object. The objects may be physical objects in the scene 100 such as a door of a house, an arm of a person, or a sky in the background. The size may be determined using computer image analysis, radar analysis, etc. The object class may be determined using computer image analysis, object recognition, motion detection, radar analysis, etc. Image frames 103 of the video stream may be used for image analysis if it is employed.

The object class may be determined through an object detector or an object classifier. The object classifier may be implemented as hardware, designed for or suitable for object detection. The object classifier may be implemented as computer instructions or software stored on a computer-readable storage medium that instructs a computer, or devices with processing capability, to perform object classification when the instructions are executed. FIG. 7a shows an image frame 103 of a scene 100 similar to previous figures. However, here a bird may be seen sticking out its head from the top of the tree. This corresponds to the detection S1002 of a new event 112 and a corresponding new event area 114 is determined S1004. Yet, no visual indicator is added. This may be due to the determination S5001 that the object associated with the new event 112 is a bird and that the object belongs to an object class for birds. Birds may in this example be defined as a less important or relevant object class. This may be the case for a monitoring camera covering a parking lot as the human operator would likely not need to be alerted every time a bird appears in the scene 100.

An alternate example that may instead see birds being defined as a high importance/relevance object class may be the case where the camera is configured to monitor an airport runway area. Detecting birds would be a high priority for this area of application because of the danger they may pose for aircraft landing and taking of. Hence visual indicators 116 may be added to new events 112 associated with objects belonging to an object class for birds.

FIG. 7b shows a similar image frame to the one in FIG. 7a, however, this time the image frame 103 is provided with a visual indicator 116. This is the case, even though, the new event area 114 of bird clearly overlaps the event area of the tree. The adding S1008 of the visual indicator 116 in the case of FIG. 7b may be result of determining, that the determined S5003 size of the object (i.e. the bird) associated with the new event 112 is smaller than e.g. a predetermined threshold. The predetermined threshold for size may e.g. in such a case be realized as a ratio of the new event area 114 and the event area of the tree. This may increase the chance of detection of small new events 112 or objects otherwise at risk of being eclipsed by larger objects or events. The reverse case, where larger new events 112 or objects are provided with a visual indicator 116 and smaller new events 112 are not, is also a possibility even though it is not exemplified in the figures.

Figure 9A:
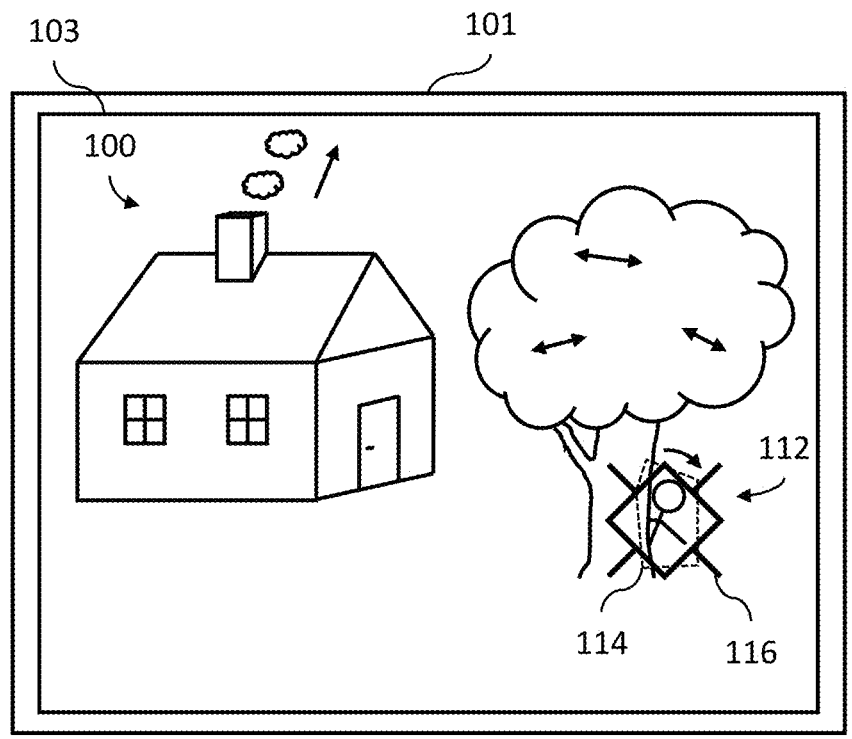
FIGS. 9a-b illustrate two different image frames of a video stream and how a visual indicator may be configured to follow a movement of a new event.
Figure 9B:
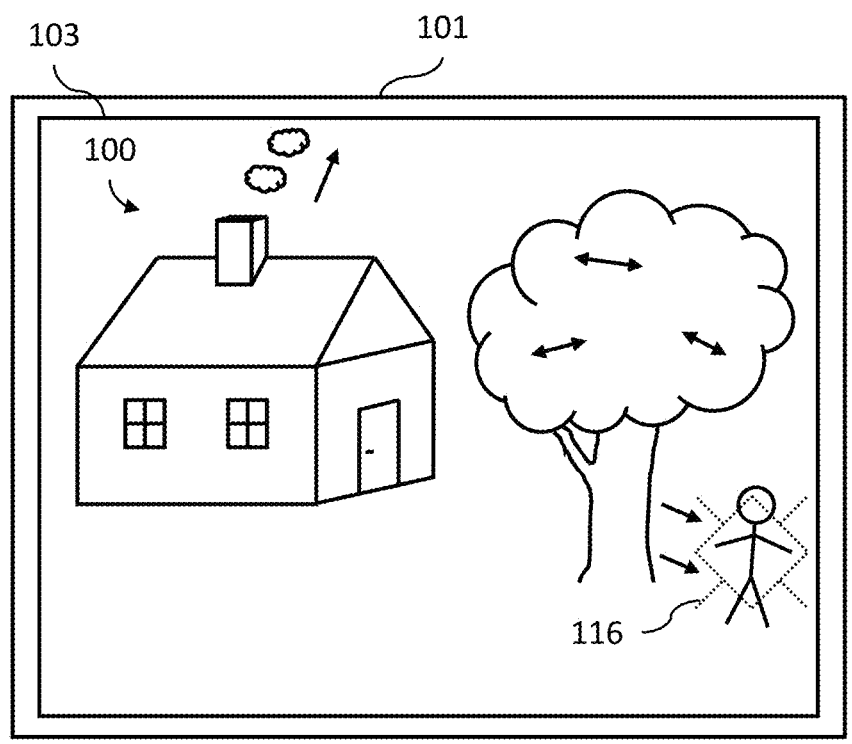

FIGS. 9a-b show image frames 103 of a video stream to exemplify how the visual indicator 116 may be configured to follow a movement of the new event 112 across subsequent image frames 103 of the video stream. In FIG. 9a, the visual indicator 116 is added to the person appearing behind the tree. The person corresponds to a detected S1002 new event 112 with a corresponding determined S1004 new event area 114, In FIG. 9b, the visual indicator 116 is moved to follow the person's movement from the image frame 103 of FIG. 9a. The visual indicator 116 may also change in appearance according to the above and this is exemplified in FIG. 9a.

Figure 10A:
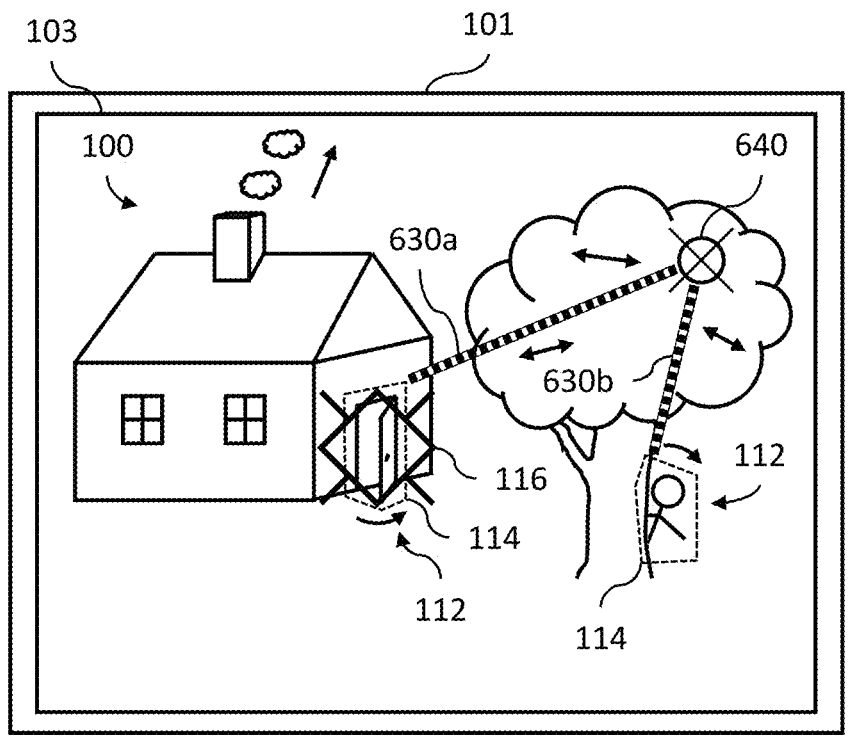
FIGS. 10a-b illustrate how visual indicators may be added based on a distance between a new event and a viewed point.
Figure 10B:
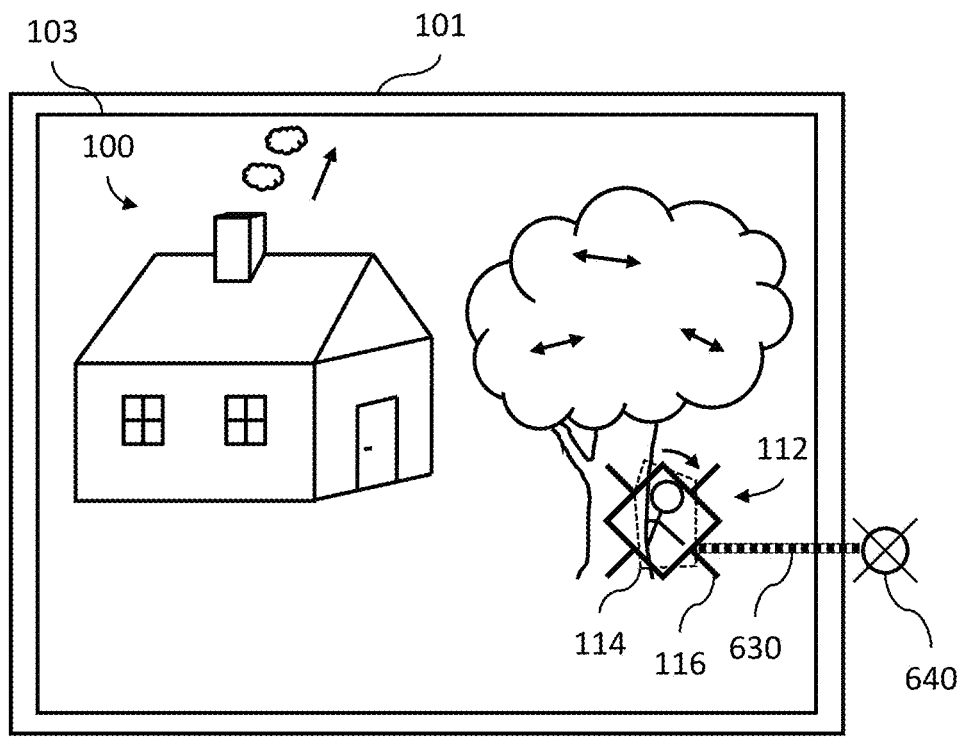
Figure 11:
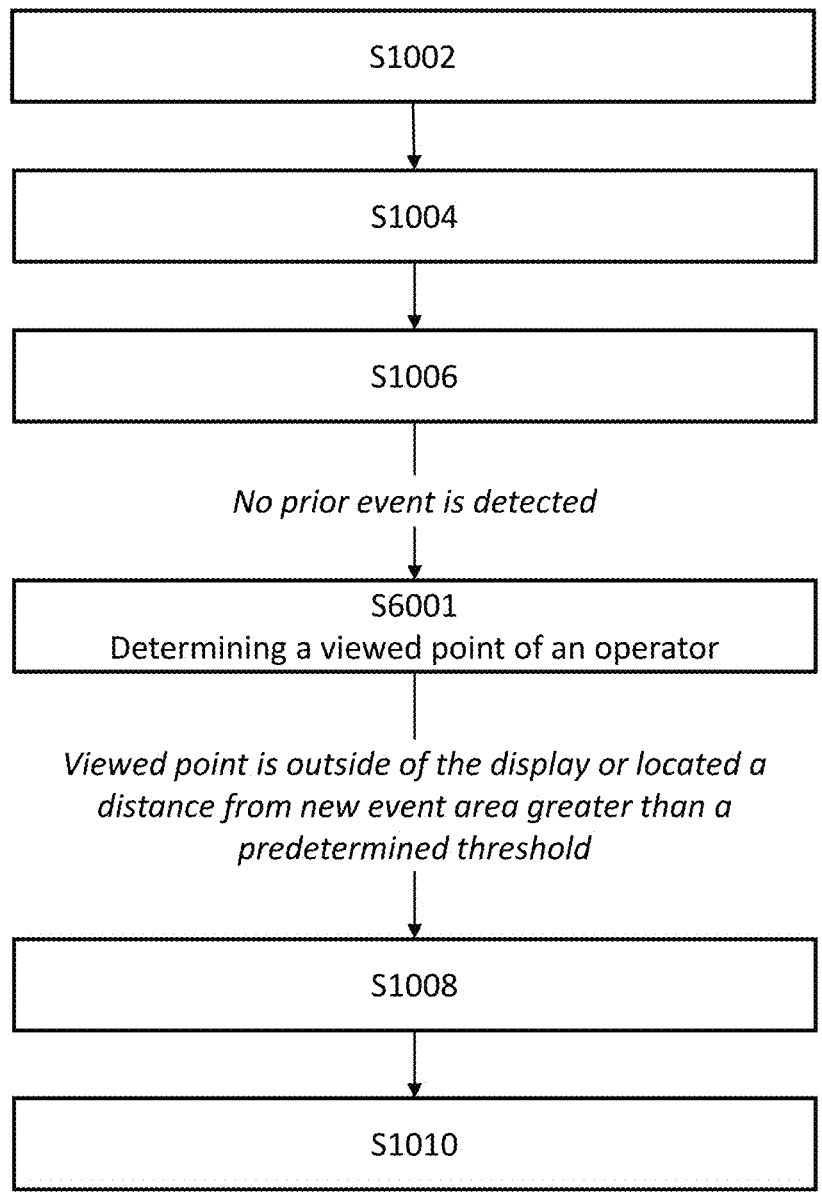
FIG. 11 shows a flow chart of a method of displaying a video stream with a visual indicator based on a distance between a new event and a viewed point.

In connection with FIGS. 10a-b and FIG. 11, different embodiments of the method, that comprises a further step concerning finding out where a human operator is looking, will now be disclosed. FIGS. 10a-b provide illustrated examples of how these further steps relate to events and features of an image frame 103 while FIG. 11 provides a step-by-step walkthrough of the method of these embodiments.

As shown in FIG. 11, different embodiments may further comprise determining S6001 a viewed point 640 of at least one eye of an operator viewing the display. The step of adding S1008 the visual indicator 116 may be performed upon determining that the viewed point 640 is outside of the display 101 or upon determining that the viewed point 640 is located a distance 630 from the new event area 112 that is greater than a predetermined threshold.

FIG. 10a shows an image frame 103, similar to previous ones. In the image frame 103, two new events 112 are detected S1002 and corresponding new event areas 114 are determined S1004. However, a visual indicator 116 is only added S1008 to the new event 112 corresponding to the door of the house being opened. The new event 112 corresponding to the person appearing behind the tree's trunk is not indicated. In this example, this is due to the distance 630 between the viewed point 640 and the respective new event areas 114.

The distance 630a between the viewed point 640 and the new event area 114 of the door is greater than the predetermined threshold while the distance 630b between the viewed point 640 and the new event area 114 of the person is smaller than the predetermined threshold. The reasoning behind this model is that more proximate new events 112 to the determined S6001 viewed point 640 are less likely to be missed by a human operator viewing the video stream.

FIG. 10b shows a similar image frame 103 to the one in FIG. 10a with only one new event 112, the person appearing behind the tree's trunk, being present. The viewed point 640 is also relocated to a point outside of the image frame 103. In this case, the distance 630 between the viewed point 640 and the new event area 114 is less than the predetermined threshold, yet, a visual indicator 116 is still added S1008 to the new event 112. This is due to the viewed point 640 being determined to be outside of the image frame 103, in this case corresponding to the viewed point being outside of the display.

The viewed point 640 of at least a one eye of the operator may be determined by gaze detection. The viewed point 640 may be determined using an eye tracker device. The eye tracker device may be integrally part of or communicatively connected to the display 101 on which the operator is viewing the video stream. Gaze detection and/or eye tracking may be performed on multiple eyes of a plurality of operators viewing the one or a plurality of video streams on the one or a plurality of displays.

Eye tracking may be realized by including a camera directed towards the operator. The acquired images from such a camera may be used for determining, by known methods, a viewing direction of the operator and the viewed point 640. Such a camera may be considered an eye tracker device.

Upon determining, that the viewed point 640 is outside of the display 101 or upon not being able to determine S6001 the viewed point 640 altogether, visual indicators 116 may be configured to claim the operator's attention through e.g. featuring a stroboscopic appearance or other similarly violent appearances. The method may further be adapted to trigger sound from a connected speaker to get the attention of the operator. As such, attention may be regained even if the operator is looking away and, in some cases, even if the operator has fallen asleep.

In general, the present disclosure discloses a number of different examples of filters for adding S1008 the visual indicator 116 to new events 112. These filters may be combined with each other to produce a combined filter. The combination may be set up with weights for each filter that essentially grade the filters contribution to the resulting filter. It is appreciated that this weighting may be setup differently for different types of applications or environments.

Some filters described herein include adding S1008 the visual indicator 116:

Upon no prior event being detected during the predetermined time period;

Upon determining that the distance 330 between the new event area 114 and the separate event area 324 is greater than a predetermined threshold;

Upon determining that the level of motion is greater than a predetermined threshold;

Based on the determined object class;

Based on the determined size of the object;

Upon determining that the viewed point 640 is located outside of the display; and Upon determining that the viewed point 640 is located at a distance 630 from the new event area 114 that is greater than a predetermined threshold.

The invention may further be realized as a non-transitory computer-readable storage medium having stored thereon instructions for implementing the computer implemented methods discussed herein, when executed on a device having processing capabilities. The non-transitory computer-readable storage medium may a data storage disc, e.g. a hard disc drive or a compact disc. The non-transitory computer-readable storage medium may be a solid-state memory device such as e.g. a flash memory or a solid-state drive. The non-transitory computer-readable storage medium may be part of a client device.

Figure 12:
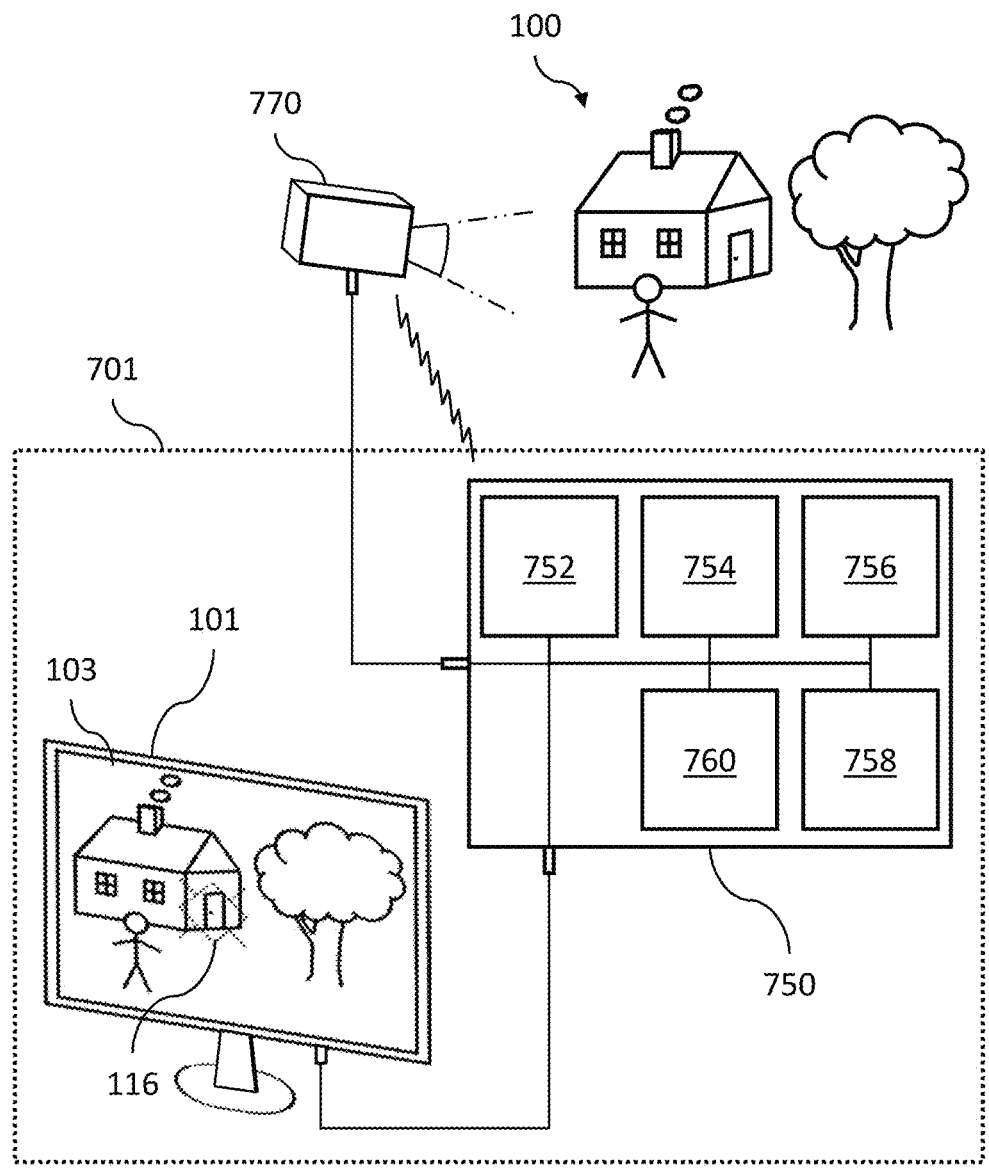
FIG. 12 illustrates a client device for displaying a video stream of a scene in a system with a video capture device capturing the video stream.

FIG. 12 illustrates a client device 701 for displaying a video stream of a scene 100. The client device 701 is shown connected to a video capture device 770 capturing the scene 100 and transmitting it to the client device 701.

The client device 701 may be connected to a plurality of video capture devices 770. The client device 701 may be configured to receive a plurality of video streams from the plurality of video capture devices 770. The client device 701 may comprise a decoder. The client device 701 may comprise a graphics processing unit. The client device 701 may comprise an encoder. As also shown in FIG. 12, the client device 701 may be comprised in a system with the video capture device 770.

The video capture device 770 may be a video camera. The video capture device 770 may be adapted for surveillance or monitoring purposes. The video capture device 770 may be an integral part of the client device 701 or be physically disconnected and communicatively coupled with the client device 701. The video capture device 770 may be configured for wireless or wired transmission of the video stream to the client device 701. The video capture device 770 may be part of a network of a plurality of connected video capture devices 770. The video capture device 770 may be a monitoring camera for wide-angle imaging, panoramic imaging, or 360-degree imaging.

Now consider FIG. 12. The client device 701 comprises control circuitry 750 configured to execute an event detection function 752 configured to detect a new event in the scene 100. The control circuitry 750 is further configured to execute an event localization function 754 configured to determine a new event area in the scene 100, corresponding to the area in the scene 100, within which the new event is detected.

The control circuitry 750 is further configured to execute an event comparison function 756 configured to check whether a prior event has been detected within the new event area during a predetermined time period preceding the new event. The control circuitry 750 is further configured to execute an indicator adding function 758 configured to, upon no prior event being detected during the predetermined time period, add a visual indicator 116 to an image frame 103 and to a number of subsequent image frames 103 of the video stream. The visual indicator 116 coincides with the new event area in this embodiment.

The indicator adding function 758 is further configured to gradually change an appearance of the visual indicator 116 throughout a number of image frames being subsequent to the currently displayed image frame 103. The control circuitry 750 is further configured to execute a display function 760 configured to display the video stream with the added visual indicator 116 on a display 101 of the client device 701.

The display 101 may be an integral part of the client device 701 or be physically disconnected and communicatively coupled with the client device 701.

Additionally, variations to the disclosed embodiments can be understood and effected by the skilled person in practicing the claimed invention, from a study of the drawings, the disclosure, and the appended claims.

The invention claimed is:

1. A computer implemented method for displaying a video stream of a scene captured by a video capture device on a display of a client device, the method comprising:
    detecting a new event in the scene,
    determining a new event area in the scene within which the new event is detected,
    checking whether a prior event has been detected within the new event area during a predetermined time period preceding the new event,
    detecting a separate event ongoing in the scene simultaneously with the new event,
    upon the separate event being detected, determining a separate event area in the scene within which the separate event is detected,
    determining a distance between the new event area and the separate event area,
    upon no prior event being detected during the predetermined time period and upon determining that the distance between the new event area and the separate event area is greater than a predetermined threshold, adding a visual indicator to an image frame temporally corresponding to the detection of the new event and to a number of subsequent image frames of the video stream, wherein the visual indicator coincides with the new event area, and wherein the step of adding the visual indicator comprises gradually changing an appearance of the visual indicator throughout the number of subsequent image frames, and
    displaying the video stream with the added visual indicator on the display of the client device.

2. The computer implemented method according to claim 1, further comprising determining a duration since a last prior event in the new event area, wherein the number of subsequent image frames and/or the appearance of the visual indicator is based on the duration.

3. The computer implemented method according to claim 1, wherein the number of subsequent image frames and/or the appearance of the visual indicator is based on the distance between the new event area and the separate event area.

4. The computer implemented method according to claim 1, comprising determining a level of motion of the new event, wherein the step of adding the visual indicator is performed upon determining that the level of motion is greater than a predetermined threshold.

5. The computer implemented method according to claim 1 comprising determining a level of motion of the new event, wherein the number of subsequent image frames and/or the appearance of the visual indicator is based on the level of motion.

6. The computer implemented method according to claim 1, further comprising determining an object class pertaining to an object associated with the new event, wherein the step of adding the visual indicator is performed based on either the determined object class.

7. The computer implemented method according to claim 1, further comprising determining a size of the object associated with the new event, wherein the step of adding the visual indicator is performed based on the determined size of the object.

8. The computer implemented method according to claim 1, wherein the visual indicator is configured to follow a movement of the new event across subsequent image frames of the video stream.

9. The computer implemented method according to claim 1, wherein the step of gradually changing the appearance of the visual indicator comprises one or more of gradually expanding, gradually fading out, gradually changing form, gradually rotating, and gradually changing a color of the visual indicator throughout the number of subsequent image frames.

10. The computer implemented method according to claim 1, further comprising determining a viewed point of at least one eye of an operator viewing the display,
   wherein the step of adding the visual indicator is performed upon determining that the viewed point is outside of the display or upon determining that the viewed point is located a distance from the new event area that is greater than a predetermined threshold.

11. A non-transitory computer-readable storage medium having stored thereon instructions for implementing the computer implemented method according to claim 1, when executed on a device having processing capabilities.

12. A client device for displaying a video stream of a scene, the client device comprising control circuitry configured to execute:

an event detection function configured to detect a new event in the scene and to detect a separate event ongoing in the scene simultaneously with the new event, an event localization function configured to determine a new event area in the scene, corresponding to the area in the scene, within which the new event is detected and to determine a separate event area in the scene within which the separate event is detected, an event comparison function configured to check whether a prior event has been detected within the new event area during a predetermined time period preceding the new event and to determine a distance between the new event area and the separate event area, an indicator adding function configured to, upon no prior event being detected during the predetermined time period and upon determining that the distance between the new event area and the separate event area is greater than a predetermined threshold, add a visual indicator to an image frame and to a number of subsequent image frames of the video stream, wherein the visual indicator coincides with the new event area, and wherein the indicator adding function is further configured to gradually change an appearance of the visual indicator throughout the number of subsequent image frames, and a display function configured to display the video stream with the added visual indicator on a display of the client device.

13. A system comprising:

a client device according to claim 12, and a video capture device.

14. The system according to claim 13, wherein the video capture device is a monitoring camera for wide-angle imaging, panoramic imaging, or 360-degree imaging.

* * * * *